United States Patent [19]

Warman

[11] 4,232,198

[45] Nov. 4, 1980

[54] DEVICE FOR ESTABLISHING CONFERENCE CALLS VIA AT LEAST ONE TELEPHONE EXCHANGE SWITCHING SYSTEM

[76] Inventor: Bloomfield J. Warman, 67, King Harold's Way, Bexleyheath, Kent, England

[21] Appl. No.: 948,271

[22] Filed: Oct. 3, 1978

[30] Foreign Application Priority Data

Oct. 6, 1977 [GB] United Kingdom ............... 41713/77

[51] Int. Cl.³ ............................................. H04M 3/56
[52] U.S. Cl. ................................................ 179/18 BC
[58] Field of Search ........................ 179/18 BC, 1 CN

[56] References Cited

U.S. PATENT DOCUMENTS

| | | | |
|---|---|---|---|
| 3,210,476 | 10/1965 | Shaer | 179/18 BC |
| 3,502,817 | 3/1970 | Westerlund et al. | 179/18 BC |
| 3,504,130 | 3/1970 | Gorgas et al. | 179/18 BC |
| 3,912,874 | 10/1975 | Botterell et al. | 179/18 BC |

FOREIGN PATENT DOCUMENTS 973478 10/1964 United Kingdom .

*Primary Examiner*—Thomas W. Brown

*Attorney, Agent, or Firm*—Sughrue, Rothwell, Mion, Zinn and Macpeak

[57] ABSTRACT

The invention concerns a device for use in establishing telephone conference calls, the object of the device being to enable an originating subscriber to connect a plurality of telephone exchange lines in parallel to provide a conference connection, utilizing existing telephone exchange switching facilities which do not necessarily provide for conference connections. The device comprises a so-called conference bridge, and switching means responsive to incoming command signals transmitted from a remote telephone station for connecting the remote caller either to an outlet to a telephone exchange line capable of receiving dialled switching signals for establishing a switched connection to a called party, or to an inlet port of the conference bridge. The logical functions of the switching means are so interrelated that solely in response to incoming command signals connections can be dialled in succession from outgoing exchange lines to called parties, the established connections subsequently being held in connection with the conference bridge, to which the remote calling party can then establish a connection for completion of the conference call.

10 Claims, 9 Drawing Figures

DEVICE FOR ESTABLISHING CONFERENCE CALLS VIA AT LEAST ONE TELEPHONE EXCHANGE SWITCHING SYSTEM

BACKGROUND OF THE INVENTION

Telephone conferences in which several subscribers' telephones are connected via a common pair of wires or to a common connecting point by pairs of wires so that each telephone instrument may be in receipt of transmissions from all the others so as to form a multiparty teleconference connection are well known and many private telephone systems are arranged to be capable of adaptation so as to be able to set up and supervise such multiparty connections under control of the dialling or keysending of the subscribers or on the part of the operator either manually or through the automatic working of the private system in question.

However, through such conference arrangements relying on the control and supervisory arrangements of the private telephone system in question for the establishment and supervision of the teleconferencing connections their scope is commonly limited by the span of the private system so that such dial or key up conference connections can only be made to join subscribers on the same private exchange.

If arrangements are made to extend connections of the conference to subscribers on other exchanges then this is commonly performed through the intervention of the operator. Without the intervention of further distant operators such external connections have to be fanned out individually to each such external conferee from the conference bridge of the originating exchange. Many of these external conferees may be located at or close to the same distant exchange which will result in a multiplicity of paths being set up between the two exchange locations and carrying the same connection resulting in a high connecting charge for the conference, especially if the two exchange locations are far from each other and the connections are made over the public network. This will also result in excessive occupancy on exchange lines to the public network and/or excessive traffic on any privately and/or rented tie lines that are used in such multiple parallel paths.

The principle utility of multiparty conference connections is realised when they span conferee's widely separate locations. Restriction to the environs of the single exchange gives more of a convenience than a service since the accessible conferees are similarly located and least in need of this.

SUMMARY OF THE INVENTION

It is an object of the present invention to provide means whereby separate ancillary subscriber controlled conference equipments can be utilised in attachment with exchanges of any known type so as to be accessed through the exchange and controlled by the use of V.F. keypad telephones of the well known type, or dial telephones adapted to be able to send similar tones, so as to set multiparty telephone conference calls through the associated exchange and enable access to a wider network with full control over their collective holding and individual release from the common conference connection thus made and preferably with a separate talk path which can give individual secret access to each, all under the control of only two extra command signals beyond those necessary for the control of a normal two party telephone call.

The invention accordingly provides a device for use in establishing conference calls via at least one telephone exchange switching system, comprising a conference bridge for providing a two way speech path between any two or more ports thereof, first switching means for selectively connecting an inlet of said conference device to one of said conference ports or to any one of a plurality of outlets intended, in use, to be connected to corresponding lines of a telephone exchange switching system, second switching means for connecting any one or more of said outlets of the device to ports of said conference bridge, and control means responsive to respective incoming command signals received at said inlet for actuation of said first and second switching means, whereby a remote caller can firstly obtain a direct connection to a telephone exchange line connected at a selected outlet in order, by transmission of dialling or other call setting signals as required by said exchange, to establish a further switched connection to a called party, and then can establish a conference connection via an associated conference bridge between himself and that subscriber and any one or more similarly and successively connected called parties via further similar ports of said conference bridge.

Preferably the arrangement is such that the said command signals shall comprise not more than two more standard signal tones of a V.F. telephone keypad in addition to those corresponding to the diallable numbers. In this case the arrangement may conveniently be such that the said first switching means normally connects the said inlet of the device to said one port of the conference bridge, actuation of said first switching means to connect said inlet to a selected outlet being dependent upon the receipt by said control means of a first one of said additional two tone signals applied at said inlet, and actuation of said second switching means to connect a selected outlet to said conference bridge being dependent upon further actuation of said first switching means following the setting of a call from a said selected outlet by the transmission of call setting signals.

In order to enable the subscriber controlling the conference also to maintain individual control over the state of the lines of individual call parties in addition to the overall control provided by the supervisory equipment of the conference device the arrangement is preferably further such that with the said first switching means connecting said inlet to a selected outlet release of a call set from said selected outlet is dependent either upon clearing down of the line connected to said inlet or upon the receipt by said control means of the second one of said two additional signals. Thus a further control function is provided whilst still maintaining the requirement for only two additional V.F. signals as provided on the standard V.F. keypad.

It is a further, preferred object of the invention by means of this command simplicity and consequent ease of subscriber control and signalling to enable the subscriber controlled conference equipment to be used to access further similar equipments which may be remote whilst retaining the same full facilities and control to associate subscribers in the conference mode at any of the locations thus joined so that although there may be several accessed at each of the several subscriber controlled conference equipments there is not more than one switched or permanently tied transmission path between any of these equipments.

Accordingly in a further embodiment of the invention the arrangement is such that with said first switching means connecting said inlet to the said one port of the conference bridge, receipt by said control means of a predetermined signal other than the first one of said two additional signals is effective to inhibit further actuation of the said control means other than in response to receipt of unique diallable code signals replacing said first and second additional signals. In this manner ambiguity in signals transmitted to more than one device in accordance with the invention simultaneously may be avoided, since all devices other than that for which the said unique signals are intended may be rendered unresponsive. The fact that at the inlet to the conference bridge all V.F. signals other than the said first signal are redundant is inherent in the structure of the device, and advantage may be taken of this for utilising other coded signals to effect ancillary functions of the device whilst the first switching means is in this position. For example remote control of tape recorders, devices providing background music or prerecorded announcements, or the like, may all be operated by transmission of appropriate digitally coded signals. The device may further be adapted for conversion from the transmission of outwardly dialled signals suitable to any given exchange to signals to be received by a further conference device, in the same manner. Thus according to a further, preferred feature of the invention the said device may include a dial pulse generator for converting incoming V.F. tones received at said inlet into dial pulses for onward transmission as said call setting signals, the said control means being further arranged, when inhibited as specified above and when said first switching means connects said inlet to a selected outlet to inhibit operation of the V.F. to dial pulse converter upon receipt of the second one of said two additional signals so that received V.F. tones are transmitted onward as such and without mutilation by concurrent dial pulsing.

Thus the arrangement in accordance with the invention caters for a universal piece of conference equipment which can be connected in association with any exchange of commonly known type to provide this conference service for any subscriber accessible to the exchange either local or remote whilst allowing optimised trunking by requiring only a single switched transmission path between exchanges that are similarly equipped with such a conference attachment, irrespective of the number of conferees that are attached to the conference at each such exchange.

Further features, objects and advantages of the invention will become apparent from the following description taken in conjunction with the appended claims.

DETAILED DESCRIPTION OF THE PREFERRED EMBODIMENTS

Figure 1:
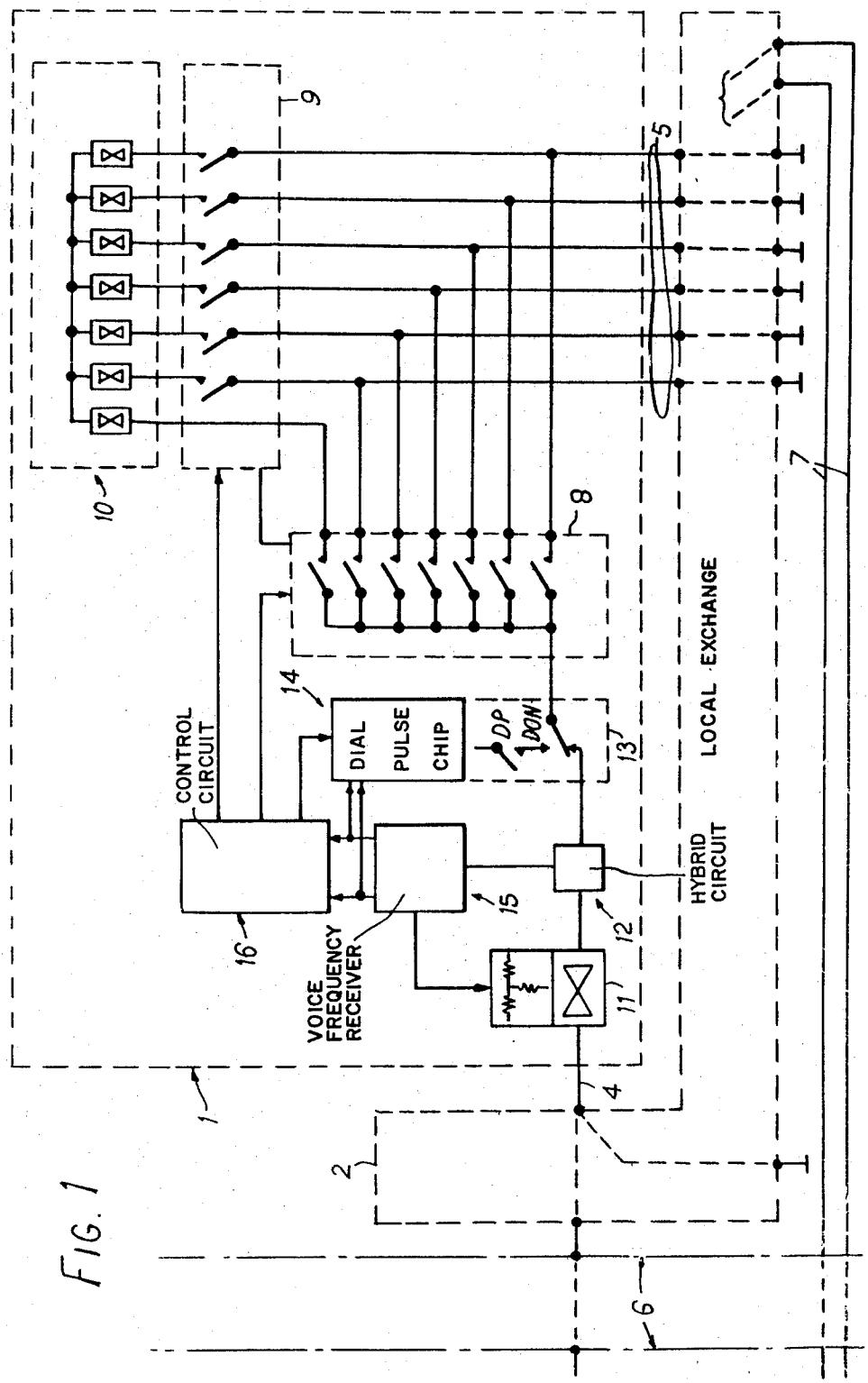
FIG. 1 shows a schematic block diagram of a subscriber controlled conference equipment in accordance with the invention and its connections to the exchange switching network.
Figure 2:
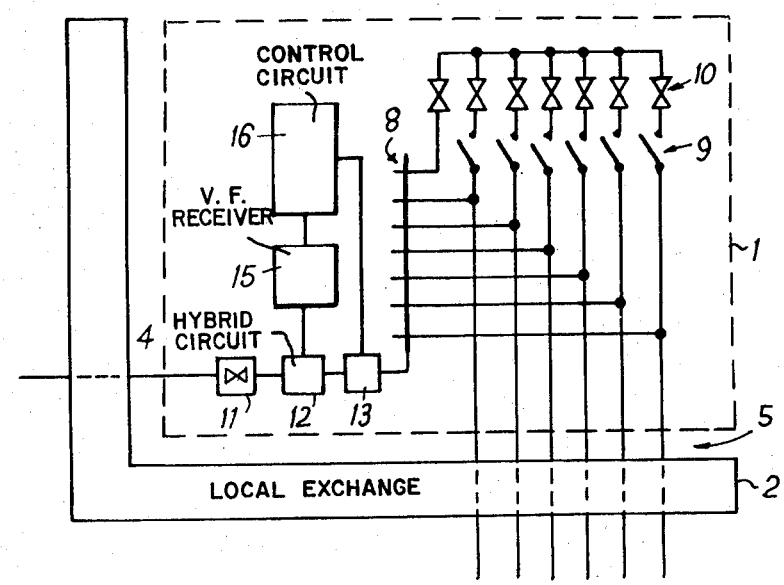
FIG. 2 is a reduced symbolic diagram indicative of the arrangement of FIG. 1 to be subsequently used in the explanatory schematic block trunking diagram of FIG. 4.
Figure 3:
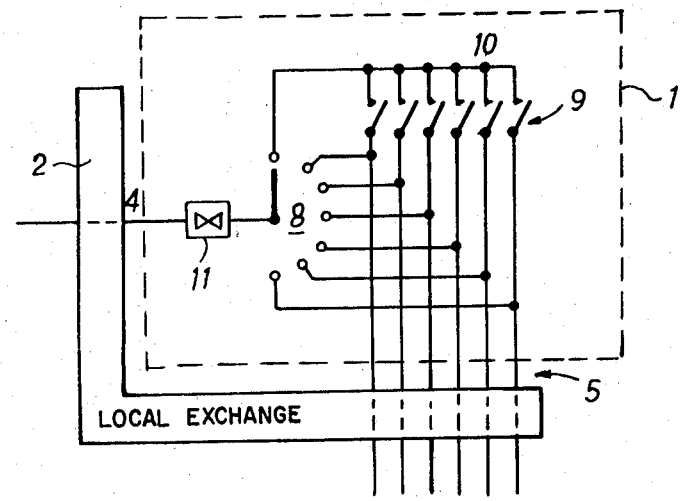
FIG. 3 is an alternative symbolic diagram of FIG. 2, FIG. 4 employs the reduced symbol of FIG. 2 to show a typical interconnection of several subscriber controlled conference equipments of the type indicated in FIG. 1 set up in tandem via successive telephone connections through the telephone network by V.F. keypad control signals from the originating telephone.

Referring to FIG. 1, there is shown within the box 1 indicated in broken lines a general block schematic circuit arrangement of a subscriber controlled conference equipment in accordance with the invention, and also how this conference equipment is connected to the periphery of the exchange switch to which the conference equipment is associated, indicated by the box 2 shown in broken lines, by connections 4 and 5. The connection 4 represents the originating subscribers control port accessible to all telephone subscribers via the exchange 2 either directly from the local subscribers on that exchange or via the main switching network 6 which may be public or private or both if the subscribers are remote. This main switching network 6 is indicated on FIG. 1 by the chain lines confining this as an area of switching which need not be further specified. The connections 5 represent the outlet ports which access the wanted conferees directly via the local exchange 2 if they are located there or out via the normal external couplings 7 of the exchange 2 to the wanted subscribers via the main switching network 6 if they are remote. The conference equipment 1 is thus connected to the associated exchange 2 and thus to all subscribers via its switching actions and those it can evoke from the main switching network 6.

As shown in FIG. 1, the conference equipment includes in the box 1 an amplified conference bridge 10 providing a plurality of conference ports, a gain compensating amplifier 11 connected to the control port 4, a hybrid circuit 12 connected between the output of the amplifier 11 and a selector switch 8 and incorporating a pick-off point providing an output to a V.F. receiver 15, and a control circuit 16 which is responsive to outputs of the V.F. receiver 15 and controls actuation of the selector switch 8 and also of a further selector switch 9.

V.F. receiver 15 receives V.F. keypad control signals from the originating subscribers telephone via the gain compensated I/C port amplifier 11 and the hybrid pick-off circuit 12 and converts these signals to be suitable for use by the control circuit 16 which comprises the electronic logic functions necessary for the control of the conference from the originating subscribers keypad signals. The gain compensated I/C port amplifier 11 is provided to restore the transmission level at the input conference port 4, serving the originating subscriber, to a zero reference level. The operation of the amplifier 11 is described in more detail in my copending U.S.A. patent application No. 895,562 now abandoned and replaced by new Continuation-in-Part Application No. 91,687 filed Nov. 5, 1979, the disclosure of which is incorporated herein by reference, and thus will not be described in further detail here.

history of the connections to the conference ports, is able to meet all the requirements of the switches 8 and 9 of FIG. 1 and the toggle memory in the control providing the single bit dialling history of the call to a conference outlet, upon which the control decision to connect the connection to the conference bus is based.

If desired, the relay counter circuit may be replaced by a relay access switch which is code marked to adopt its setting in response to digital outputs of the V.F. receiver so that a given conference port required can be accessed directly without the need for the sequence stepping actions described with reference to FIGS. 6 and 7. The "gate" signal would, however, still be necessary to prefix these digital setting signals, to avoid their being mistaken for call setting digits.

From the above description, it will be appreciated that the device in accordance with this embodiment of the invention provides the facility for any subscriber who is equipped with a telephone terminal equipped to send V.F. tones providing the standard minimum of 12 encoded signals, that is 1, 2, 3, 4, 5, 6, 7, 8, 9, 0, * (star) and # (gate), to set up a local, star radiated conference connection using the switching functions of a conventional exchange as represented by the box 2.

However, as mentioned above, the utility of a conference connection is substantially increased when it spans a greater distance, and in order to provide for longer distance conference connections with enhanced economy the possibility exists, as described in my copending U.S.A. patent application No. 895562 of connecting a plurality of conference circuits as shown in the box 1 of FIG. 1 in tandem, so that groups of conferees served by each conference circuit 1 are linked by single tie lines spanning remote locations and thus reducing the call charges that would otherwise be incurred. The trunking pattern involved in such a connection is illustrated in FIG. 4.

Figure 4:
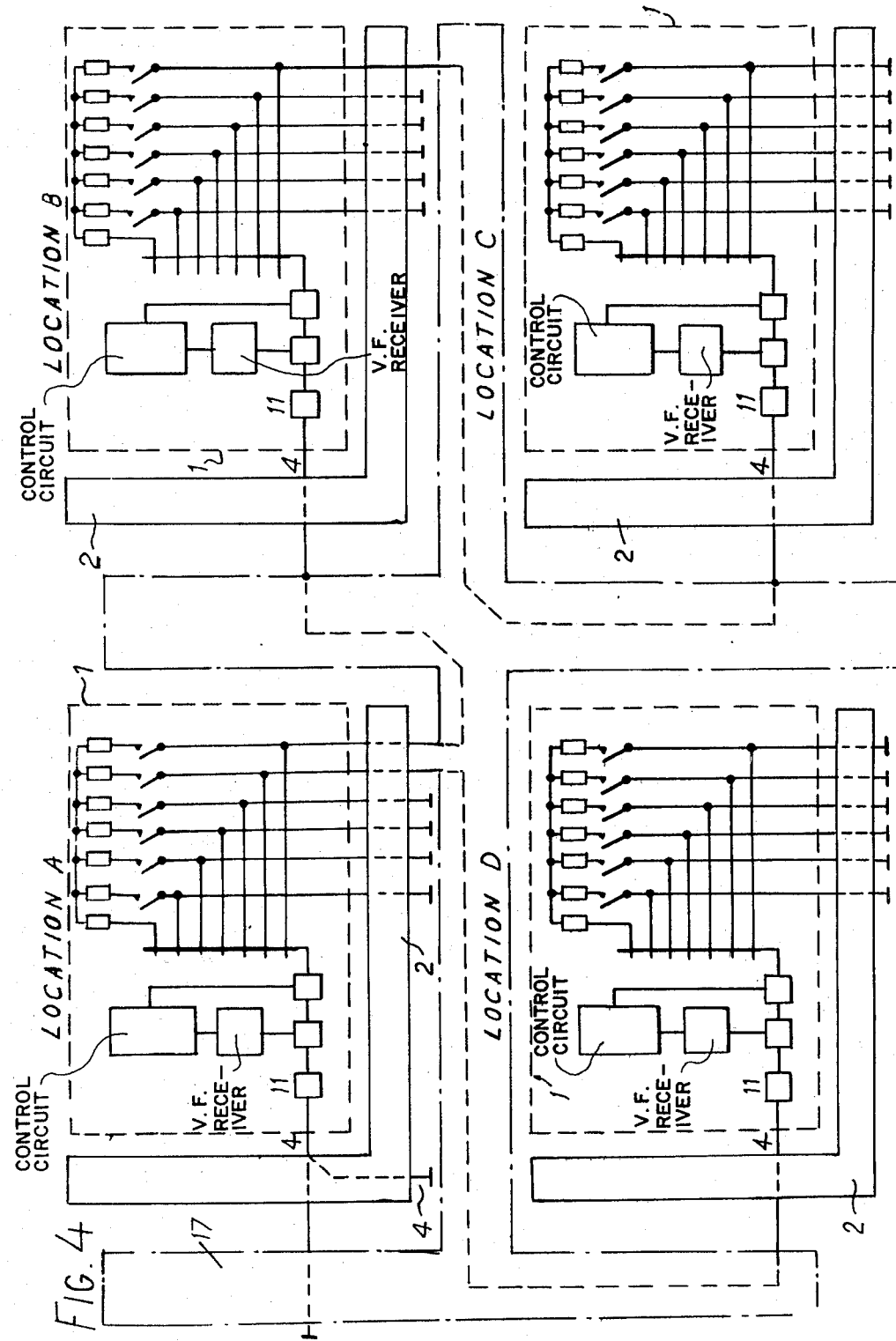

FIG. 4 shows a parallel, series trunked conference of circuits 1 of FIG. 1 connected in chain and star form to associate subscribers in different locations to the conference with a minimum of inter-connecting switching paths between the separate locations 'A', 'B', 'C' and 'D'.

The trunking pattern depicted draws on four conferees at location 'A' using a further outgoing port from location 'A' to join to location 'D' via the main switching network 17 which can of course be either public of private or both where five further conferees are connected and the option exists to bring on further conferees by contacting a further conference equipment which could of course be local as well as remote.

A further outgoing port from location 'A' joins to location 'B' via the main switching network 17 where five more conferees are drawn onto the connection with a further outgoing port extending to location 'C' where five more conferees are shown to be connected with a further port giving the option of further connections via the main switching network as required.

Thus the arrangement shown in FIG. 4 offers the prospect of nineteen conferees at four remote locations with only three main switching transmission paths joining the four locations where the conference equipment 1 as depicted in FIG. 1 is located by association with the existing telephone switching equipment there. The three main switching transmission paths between the four locations are those provided for use on normal telephone calls between these locations and are thus now shared with the needs of this new conference service.

Figure 5:
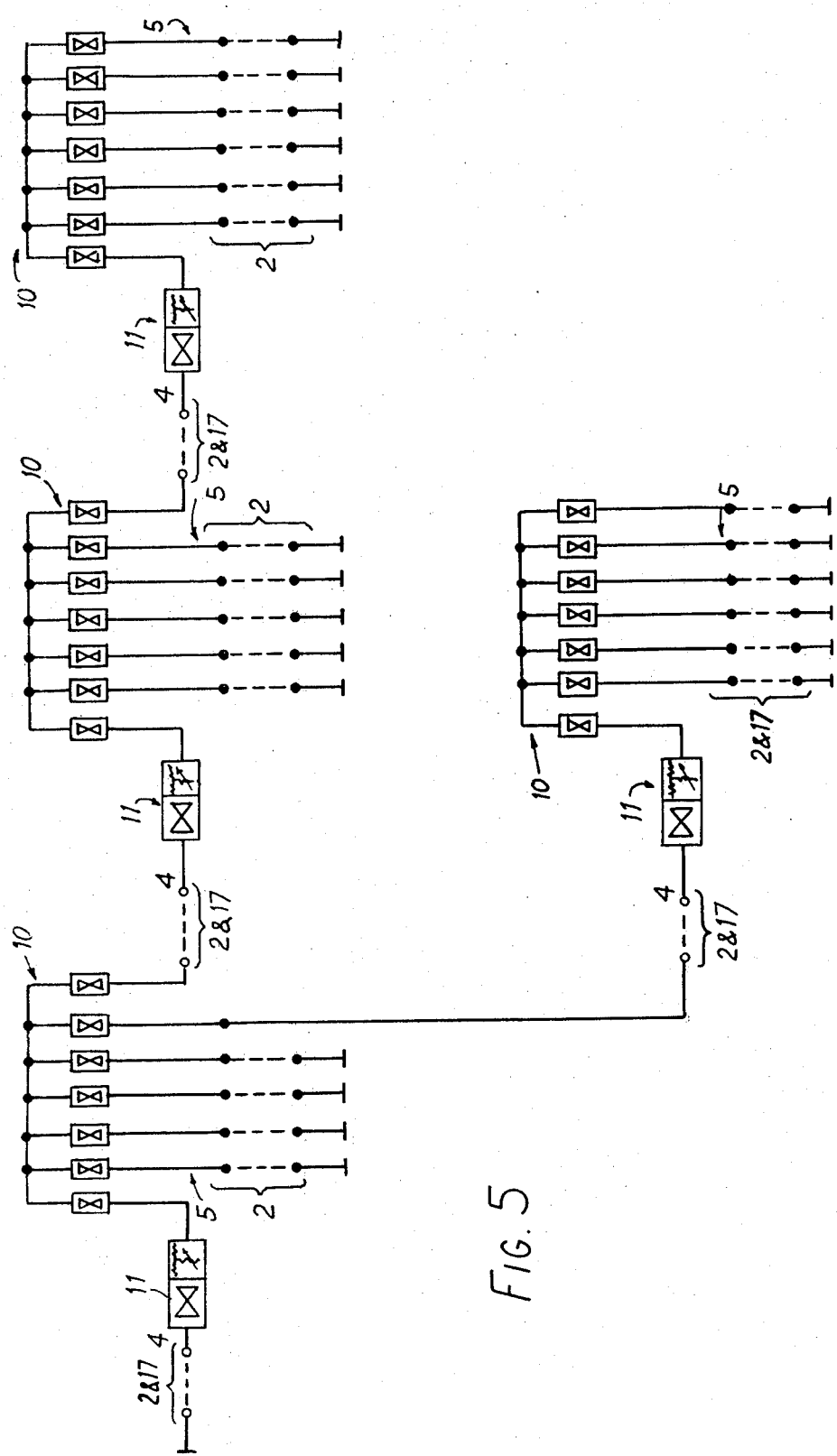
FIG. 5 shows the transmission plan of the conference interconnection established by the trunking interconnection of the several subscriber controlled conference equipments shown in FIG. 4.

FIG. 5 shows the transmission plan provided for conferees connected to the conference trunked in accordance with FIG. 4 and how each conferee is subject to only the normal telephonic loss since in each case the transmission path provided between interconnected conference circuits and involving tandem connected lines of two local exchanges 2 and one trunk 17 is compensated to zero loss by the amplifier 11 at the input port 4 of the interconnected conference circuit 1. The manner in which this is achieved is, as already mentioned above, described in my copending patent application Ser. No. 895562.

In order for a subscriber to set up a connection as illustrated in FIGS. 4 and 5, it is necessary for him, after having gained access to an outlet port 5 of the conference equipment 1 of FIG. 1 to connect that port via the local exchange 2 to the inlet port 4 of a further, remote conference equipment 1 associated with the desired, distant exchange.

It will be appreciated that when a subscriber who is already connected to one conference equipment 1 and wishes to access a second, tandem connected conference equipment 1 and to forward command signals to the second equipment to set up a conference there in the manner already described, the difficulty will exist that although the second conference equipment will recognise command signals as appertaining to itself, the same control circuits in the first conference equipment will also respond unless previously disabled.

In order to overcome this problem, each conference equipment 1 to be used in the configuration of FIGS. 4 and 5 incorporates a logic circuit which responds to the "star" signal when switch 8 is in the normal or "O" position and changes the structure of the coding field connecting the V.F. receiver to the relays CS and SS so that the latter are subsequently only operated upon receipt of unique dialled digits following the operation of the "gate" button. A further logic circuit which responds to the "star" signal when switch 8 is then subsequently connected to an outlet 5 may be made effective to disable the dial pulse chip 14 and arrange for the onward transmission of the V.F. tones in place of dial pulse signals. In this way, following the transmission of dial pulse signals to gain access to a second or subsequent conference equipment 1 via the exchange network as shown in FIG. 4, the chairman's act of transmitting the "star" signal to said equipment 1 to change its coding field is simultaneously effective in the preceding equipment 1 to replace the dial pulses with V.F. tones to which the later equipment will respond.

In one example of the above arrangement, which permits the unique addressing of conference equipments at each of five separate locations, the unique digital signals which follow the "gate" signal are as follows:

---
Location 'A' the digit 1 means 'step on' and digit 2 means 'cancel'
Location 'B' the digit 3 means 'step on' and digit 4 means 'cancel'
Location 'C' the digit 5 means 'step on' and digit 6 means 'cancel'
Location 'D' the digit 7 means 'step on' and digit 8 means 'cancel'
Location 'E' the digit 9 means 'step on' and digit 0 means 'cancel'
---

In order to set up a connection as illustrated in FIG. 4, for example, the chairman, after having set up a local conference at location A will then return switch 8 to the home or 'O' position and press his "star" button to convert to the above coding, by then pressing the "gate" and digit 1 buttons he may step the switch 8 on to a free outlet 5, as before, and transmit dial pulses to set a connection for example to the conference device at location B. Having gained a connection, he will then, whilst remaining on the relevant outlet port 5, again press his "star" button. In view of the changed coding at location A this will not be seen as a cancel signal there and will be transmitted onward to location B, where, since the switch 8 is in the home position the signal will be seen as an instruction to change the command coding to that indicated above. Simultaneously the signal will be effective at location A to inhibit dial pulse transmission so that the chairman is able, by transmission of the now V.F. coded "gate" plus "digit 3" and "gate" plus "digit 4" signals to actuate the conference equipment at location B to set up a local conference connection there, in precisely the same manner as already described above. He may also establish a further connection to conference equipment at location 'C' likewise, with the exception that since he has already changed the coding at location B, there is no need to return to the home position at location B for this purpose.

The inhibition of dial pulses is cancelled by the action of SD relay when the circuit 1 is stepped away from this outlet accessing a subequent circuit 1 so as to permit further call setting at other selected outlets 5. If the control connection of switch 8 is subsequently re-established then the "star" button signal must be re-transmitted even though the distant circuit 1 is already set to this mode of command in order that dial pulses will be inhibited at the nearer circuits 1 to avoid mutilation of the V.F. control signal forward by dial pulses.

The gate signal, which in this mode of command precedes the digital address and control signal also inhibits the dial pulse chip 14 of all circuits 1 in the connection—which inhibition being removed by all circuits 1—whether responsive or not at the end of the command signalling sequence that the gate button has indicated.

A second pressure of the gate button before completion of the command signalling sequence serves to cancel the command sequence and similarly to clear the dial pulse chip inhibition.

More than one simultaneous conference may be allowed for by providing one or more of the conference equipments 1 as shown in box 1 of FIG. 1, connected to the exchange line circuits of a hunting group accessing this service via the input ports of the conference equipment at 4 in FIG. 1 and addressed by calling to this exchange line number or numbers. Each such conference equipment will cater for a conference connection at that location thus if there are three such circuits then three simultaneous conferences can proceed at any time.

In the conference equipments described above, each conference circuit 1 incorporates its own unique arrangement of conference amplifiers A-N and corresponding outlet ports 5. Thus although the number of ports 5 must be adequate to allow of the maximum convenient number of conferees as desired, in many cases the conference capacity will be under used and exchange lines connected to outlet ports will be idle but blocked to other conference connections.

Figure 8:
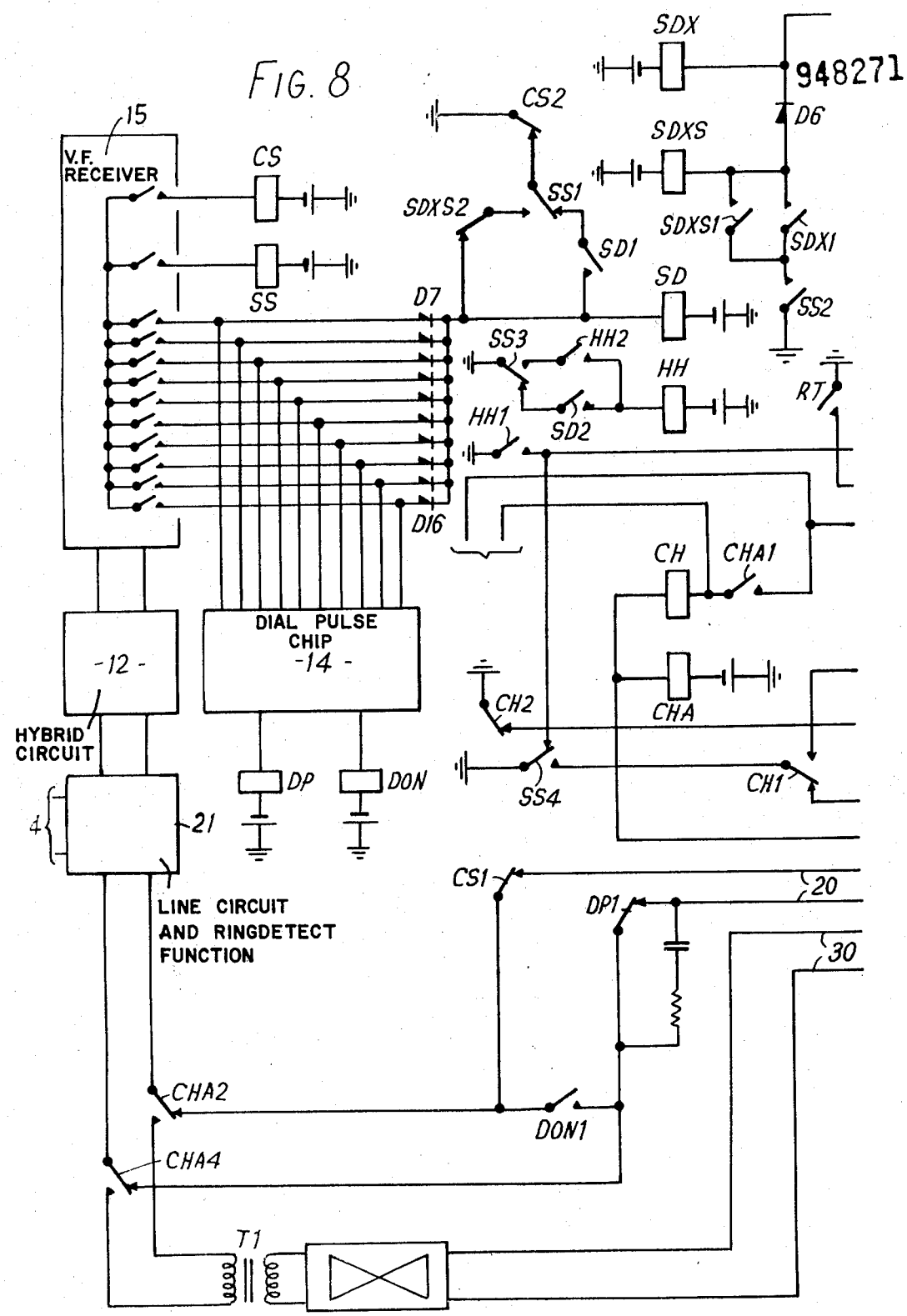
Figure 9:
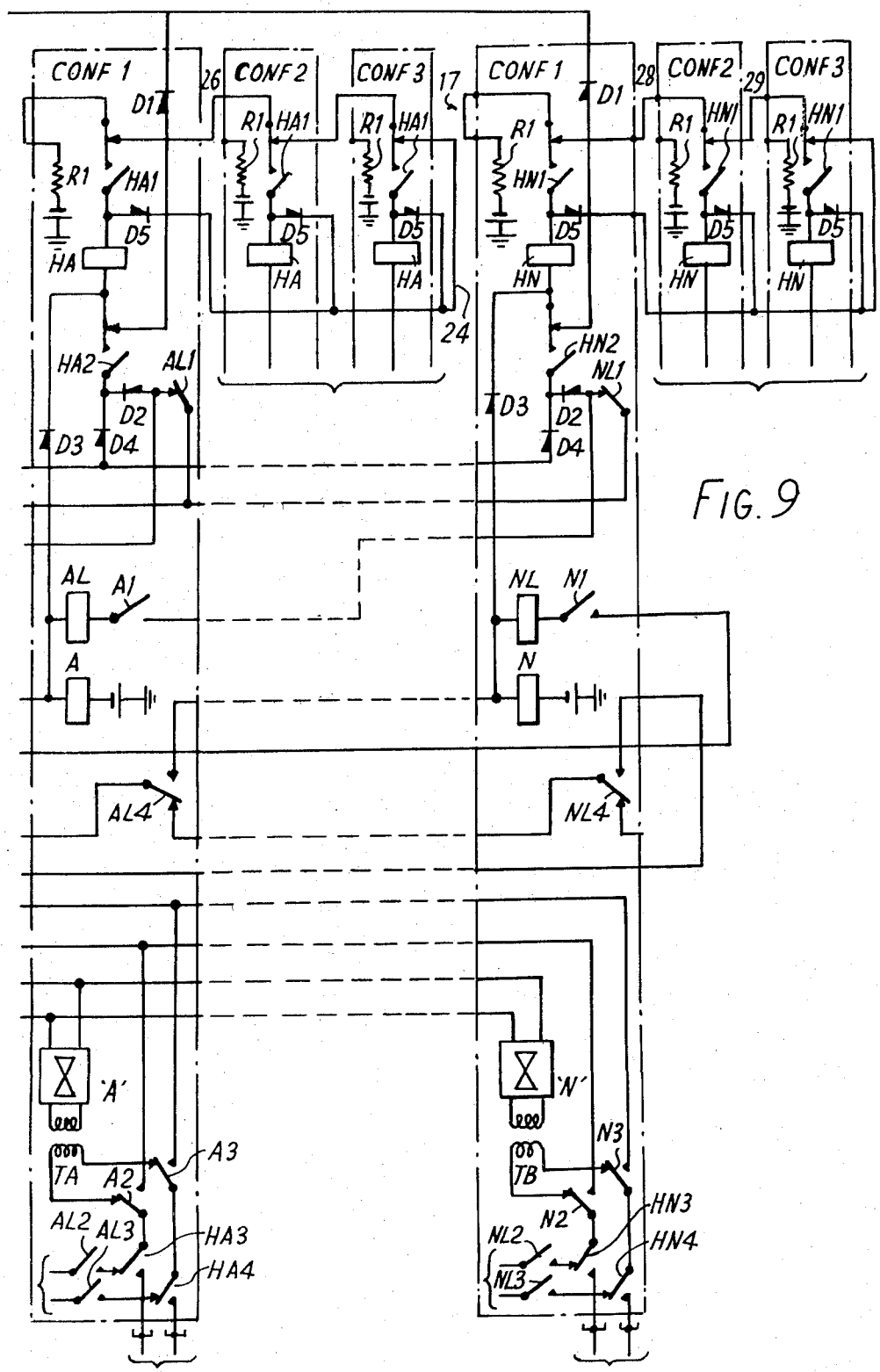

In accordance with a further embodiment of the invention illustrated in FIGS. 8 and 9, a conference circuit is provided which is adapted to be connected in common with other similar conference circuits so that the associated outlet ports to exchange lines form a common pool with graded access from which conference ports may be seized as necessary, the arrangement being such that those seized by one conference equipment are marked busy to the others.

FIGS. 8 and 9 are drawn to run onto each other and form a single circuit diagram when they are laid adjacently with FIG. 8 to the left. The circuit is similar to that of FIGS. 6 and 7 like parts being indicated with like references, and these will not be described in detail.

Figure 6:
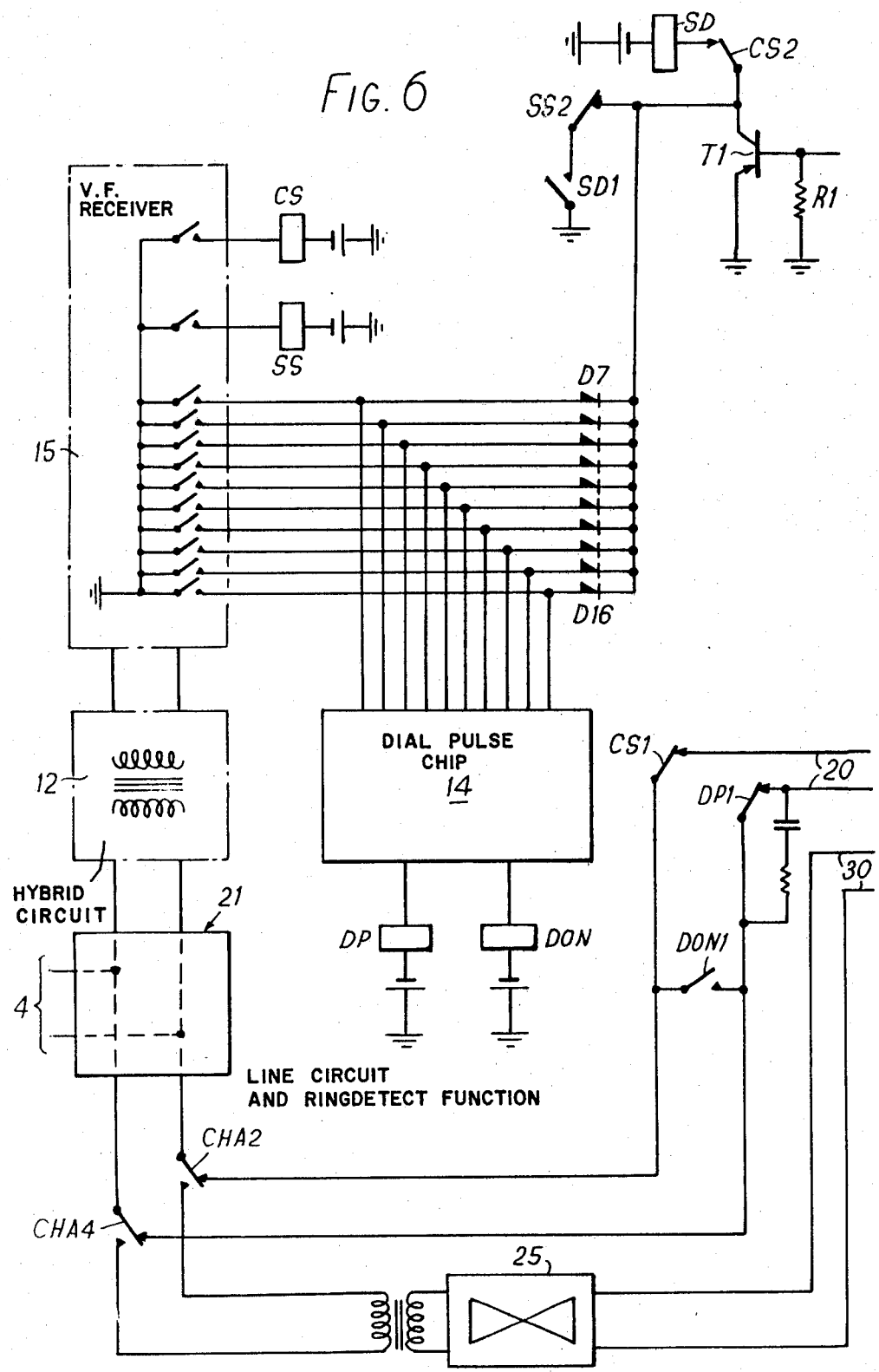
FIGS. 6 and 7 comprise a more detailed circuit diagram of one embodiment of equipment as illustrated in FIG. 1, and FIGS. 8 and 9 comprise a similar circuit diagram of a further embodiment of the invention.
Figure 7:
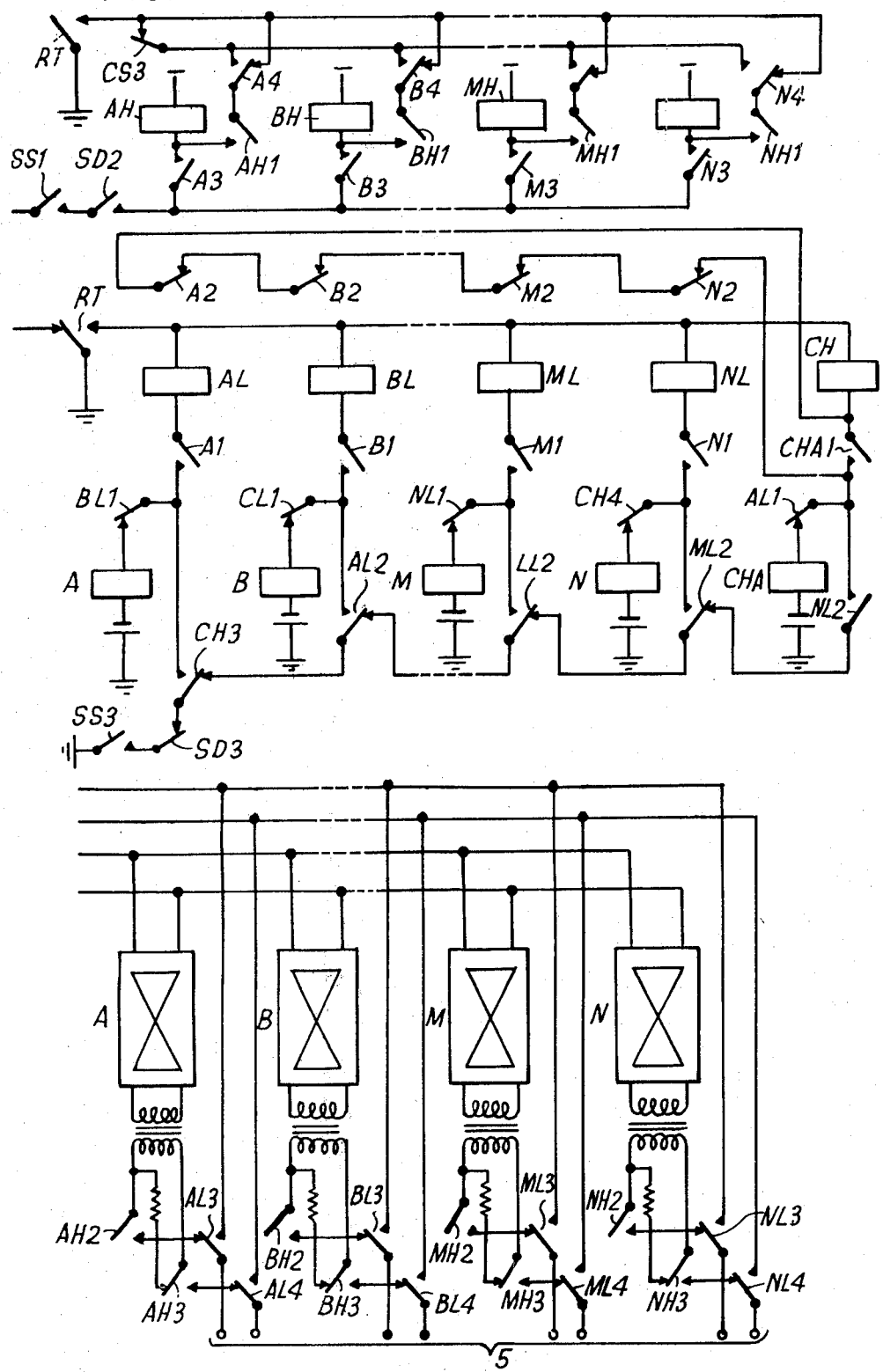

The circuit differs from FIGS. 6 and 7 in that FIG. 9 illustrates the relays HA to HN of relay counters of three conference equipments each of which is operable by means of a respective control circuit as illustrated in FIG. 8 and connected thereto as illustrated in the case of conference equipment 1 by means of the connections at the left-hand edge of FIG. 9. The access circuitry associated with relays HA and HN of conference equipment 1 is shown in full it being understood that the same circuitry is repeated in the case of the intermediate relays HB to HM in the counter chain, as indicated by the broken lines interconnecting the two parts to the circuit enclosed in dashed and dotted lines. The interconnections with conference equipments 2 and 3 are likewise shown, the remainder of the circuits of the latter equipments being identical with that of conference equipment 1.

Referring now to the drawing, the switch 8 of FIG. 1 for each separate conference equipment is formed of a relay counter including relays A to N and CH and AL to NL and CHA where CHA and CH provide the Zero or Home outlet of the sequence switch, to which outlet it is set by the operation of CH and CHA relays when the conference circuit is seized through the A4 to N4 series chain of break contacts, after the same fashion as the circuit of FIGS. 6 and 7.

The relay counter steps in an identical fashion to that described for FIGS. 6 and 7 through the application of a stepping earth at the contact SS4 when the relay SS is operated by the "gate" output of the V.F. receiver 15. The contacts A2, A3 to N2, N3 of the counter provide a changeover of any connection made to the conference lines by the contacts HA3, HA4 to HN3, HN4 between the conference port amplifiers A to N and the call setting bus 20 to which the chairman or originating subscriber is connected when the relay counter is off normal and the contacts CHA2 and CHA4 are released. This makes his connection from the line circuit and ring detect circuit 21 terminating his incoming line through to the conferee on the speak and dial call setting bus 20 via the quenched dial pulse contact DP1 with the contact DON1 to provide a clean dial pulse loop, all under control of the dial pulse chip 14 marked by the V.F. receiver 15 joined to the chairman's or originating subscriber's V.F. keypad at the line circuit and ring detector 21 by the hybrid transformer 12 giving rejection of noise passed back from the conference connection.

With the relay counter set to zero through the relays CH and CHA being operated then contacts CHA2 and CHA3 connect the chairman at the line inlet 4 to the conference bus 20 via his conference port amplifier 25. The relays HA to HN may be operated successively by the action of the contact SS4 as it steps the relay counter to the next setting and in this process applies the line test function, which gives the appropriate relay HA to HN the opportunity of operating and connecting to the line, if it is free, on each setting of the relay counter, as will be described below.

If the contacts HA3, HA4 to HN3, HN4 operate to couple the conference line then it gives dial tone to the dialling and talk loop of the speak and dial call setting bus 20 as in the previously described embodiment. If the relay HA to HN does not operate to couple the conference line, because it is already engaged in use by another conference circuit, then the contacts AL2, AL3 to NL2, NL3 of the switch counter for that conference port will be operated and connecting busy tone to the speak and dial call setting bus 20 which will be heard by the chairman or originating subscriber via the unoperated condition of the contacts HA3, HA4 to HN3, HN4 to indicate that this step of the relay counter has failed to seize a free conference line. Thus if the chairman steps the relay counter through its cycle by repeated applications of the "gate" signal then he will hear dial tone from those conference lines that are available for him to set a conference connection and busy tone from those that are not. If insufficient lines are available for the conference he needs, then he can release the connection and try again later. If there are only just sufficient available then he can dial a holding digit to simulate a connection to the line, which will cause it to be held to the conference bus 30 against seizure by another conference equipment, by retaining the operation of the relay HA to HN when the switch counter 5 is stepped to release the contacts A2, A3 to N2, N3 appropriate to that conference line. If necessary the chairman knowing that he will need to make several outgoing calls from the exchange hosting the conference equipment, can alternatively key digits which will secure the outgoing exchange lines necessary for his conference connection against seizure by other telephoning parties so that he knows these outgoing lines are seized and held available for his use when he comes to set the conference connections to them. This he can do at any time, through being able to return the relay counter to any line during the seizure of the conference equipment, so as to speak and/or rearrange the connection he has set there. As in FIGS. 6 and 7 the discrimination on whether to set the connection to the conference bus 30 via the conference port amplifiers A to N, when the chairman chooses to decouple from it by stepping the relay counter away to another setting, is based on the dialling history of the connection, as indicated by the condition of relay SD. This is released when the relay counter is stepped to the port, unless there is a conference line already coupled to that outlet through the relay HA to HN there being already operated to provide this coupling. In this case the high speed relay SDX and its slave SDXS both operating and locking together through the diode D6 to contact SS2, will not operate because the path of operation of relay SDX is via the make before break or so-called K action contacts HA2 to HN2 and the diodes D3 and D1 to the contact SS4, which in the action of stepping of the relay counter, is applying an earth in response to the "gate" signal from the V.F. receiver to operate the relay A to N of the stage of the counter that is being set to access the conference port 5 associated with this step of the counter and the relay HA to HN, which may or may not already be coupling the conference line there through its associated contacts HA3, HA4 and HN3, HN4. Thus if relays SDX and SDXS operate and lock during the stepping of the relay counter it will mean that the relay HA to HN corresponding to that step was not previously operated and that a line was not already coupled and that if the relay SD were operated then it will be released by the operation of contact SS1 when relay SS operates to step the relay counter because of contact SDXS2 severing the operate path to the relay SD that the operation of contact SS otherwise offers, in this same action. If the slave combination SDX and SDXS did not operate with relay SS and the stepping of the counter from the earth at contact SS4, then when contact SS1 operates to offer the opportunity for relay SD to release due to the operation of contact SDXS2, if this contact is not operated to break the connection indicating that there is a connection to the conference line through the relay HA to HN being operated to access it, then the relay SD is operated by the operation of contact SS1, irrespective of whether it was operated prior to the stepping action. Thus when the switch 8 of FIG. 1 steps to an outlet 5 which is already coupled to the conference equipment then the assumption is that a satisfactory call exists on this line and should be recorded as such by the operation of the relay SD. If it is not satisfactory then the chairman or originating subscriber, with the perogative of control gained by this coupling action, can apply a cancel signal, indicated for simplicity in FIGS. 7 and 8 as a "star" signal from the V.F. receiver 8 to operate the relay CS. This opens the holding loop subtended to the coupled line via the speak and dial call setting bus 20 at contact CS1 to release the connection and also clears the record of this connection by releasing the relay SD from the locking path of contact SD1 and the contact CS2. The relay SD is set as a record of attempted call setting to a conference port by recognising the sending of dialled digits to the line. This is indicated, so as to operate relay SD, by passing the digital markings from the V.F. receiver 15 which control the dialling of the dial pulse chip 14 to the line, as an earth marking via the decoupling diodes D7 to D16, to operate the relay SD, so that it holds at contact SD1 in memory of this dialling action. The operation of relay SD is followed by the operation of relay HH when relay SS is released to provide the path at contact SS3 and the stepping action of the relay counter is completed. The action of the relay HH is important, since its task is to pass the condition discriminated by the operation of the relay SD as to whether the common conference line, coupled by the operation of the relay AH to NH, should be connected to the conference bridge by retaining the operation of the relay AH to NH, when the relay counter is stepped. This can be because an uncancelled dialled connection has been made to the line during this coupling, which state it so construes requires the maintenance of the coupling. Or there already was a connection to this line by the relay HA to HN when the relay counter accessed it, which means the connection should be similarly maintained, unless the connection is cancelled. The relay SD is thus in the position of possibly operating in response to a marking feed when the relay SS operates, which must not be effective until the relay SS operates for the next time, and it is the relay HH which provides the necessary discrimination which allows this conflict of timing to be spanned.

The relay HH cannot operate to follow the operation of relay SD, until relay SS is released, which indicates that the previous stepping procedure of the relay counter is now complete. Likewise the relay HH held by the operation of contact SS3 through its own locking contact HH2 is held, independently of relay SD during the operation of relay SS in stepping the relay counter when relay SD may or may not release and may operate when relay SS operates, depending upon the conditions on the conference ports between which the speak relay counter is stepping. The condition is thus that if the relay HH is operated, indicating that relay SD was operated, then the stepping of the relay counter to access the next conference line in sequence should not release the relay HA to HN, of the previously accessed conference line, if it were operated. The holding path of relays HA to HN is normally via the make before break changeover contacts HA1, HA2 to HN1, HN2 from the resistor R1 and diode D2 and the contacts AL1 to NL1 released, to the common earth line of the earth contact RT1. When the relay counter is accessing a conference port then the contacts AL1 to NL1 associated with that conference port outlet 5 will be operated and the normal holding path for the relays HA to HN will be disconnected so that the continued operation of the relay HA to HN in question will be provided only via the diode D4 to the common earth line provided by the back contact of the changeover contact SS4.

Thus, when the relay SS operates to the "gate" signal to step the relay counter by applying earth at the make action of the changeover contact SS4, its break contact is disconnecting the hold path of the relay HA to HN so that the one accessed by the relay counter is caused to release unless the relay HH is operated to provide an alternative hold path through the contact HH1 masking the break action of the changeover contact SS4, so that the relay HA to HN in question does not release but is held throughout the stepping action of the relay counter which is until relay SS is released which at contact SS3 has been holding relay HH, if operated, via its holding contact HH2.

Once the stepping action of the relay counter is completed, as is indicated by the release of the relay SS then the next relay AL to NL will be operated and the previous one released so that the relay HA to HN, whose release has been restrained by the operated condition of the relay HH, during the operation of the relay SS now has a holding path provided by the normal condition of the contact AL1 to NL1 for that access stage. The relay HA to HN of the newly accessed stage will, if operated through having successfully coupled to the conference line, because it was free and available, as will be described presently, be holding upon the earth provided via the back contact of changeover contact SS4 and the diode D4 and prepared for a similar further step to that just now described.

The contacts A2, A3 to N2, N3 of the relay counter of the stage just released, will now be connecting the centre pole of the contacts HA3, HA4 to HN3, HN4 to the conference bus 30 so that if these contacts are operated, the conference line will be extended there and if not then the busy tone at contacts AL2, AL3 to NL2, NL3 will be disconnected from connection to the conference bus there, by the released condition of these contacts.

Thus, the conference line was connected to the conference when the chairman set the relay counter to a new setting, if there was a memory of uncancelled dialling to the connection since its seizure, or there was already a connection to the line when it was seized, which has not been subsequently cancelled, all as was shown and described for the arrangement of FIGS. 6 and 7.

The difference in the functions provided by these two arrangements lies in the testing and seizing of the conference line, which for the arrangement of FIGS. 8 and 9 can be in common pool to be shared by several such conference equipments, as will now be explained.

When the relay counter is stepped to a new setting by the application of the earth from the contact SS4, then this stepping earth from contact SS4 is also fed not only to operate the appropriate relays A to N by the chain of sequence contacts CH1 and AL4 to NL4 but also via diode D3 to the appropriate relay HA to HL, where it provides a path for the operation of that relay from the resistor R1 via the similarly designated contacts HA1 of all the conference equipments able to access that conference line, in an exclusive one-only chain connection of the make before break changeover contacts HA1 of all the conference equipments able to access that conference line, such that only one of the relays HA to HN of the several conference equipments can operate and maintain its operation since by doing so the relay HA of the circuit most towards the resistor R1, at the head of the chain, will disconnect the path of any other, which is making a similar simultaneous test and attempt to seize the line. It will be seen that each conference circuit has been provided with a resistor R1 but only that at the head of the testing chain is used. The return feed for this exclusive "one-only" path is returned in a parallel common to all the circuits via the diodes D5, which provide the operate path for the relay HA to HN in question, which, when operated, provides its own path independent of the make contact SS4 and initially via the diode D2 because the contact AL1 to HL1 is not yet operated to disconnect this path. When contacts AL1 to HL1 operate then hold is via diode D4 when contact SS4 releases to put the earth behind the common rail connecting to the diodes D4 and the contacts AL1 to NL1 have opened in completion of the relay counters stepping action to remove the holding earth via diode D2. This same contact AL1 to NL1 releases the two relays of the previous stage of the relay counter in the normal action of its working.

Thus when the relay counter operates the relay A to N in the first stage of its normal two stage action, the application of earth from the contact SS4 is also connected to apply the appropriate relay HA to HN in a testing mode to try the free and available condition of the conference line thus accessed and if it is free to operate and seize and hold it against other seizure, so as to provide the access for the relay counter which is connecting to the chairman from that line via the speak and dial call setting bus 20 as has already been explained.

It will be apparent to those skilled in the art that although the above described embodiments of the invention are constructed using electromechanical relay switching circuits, the same functions could be achieved through the application of electronic data processing and logic technology, without departing from the scope of the invention as defined in the appended claims. 9n

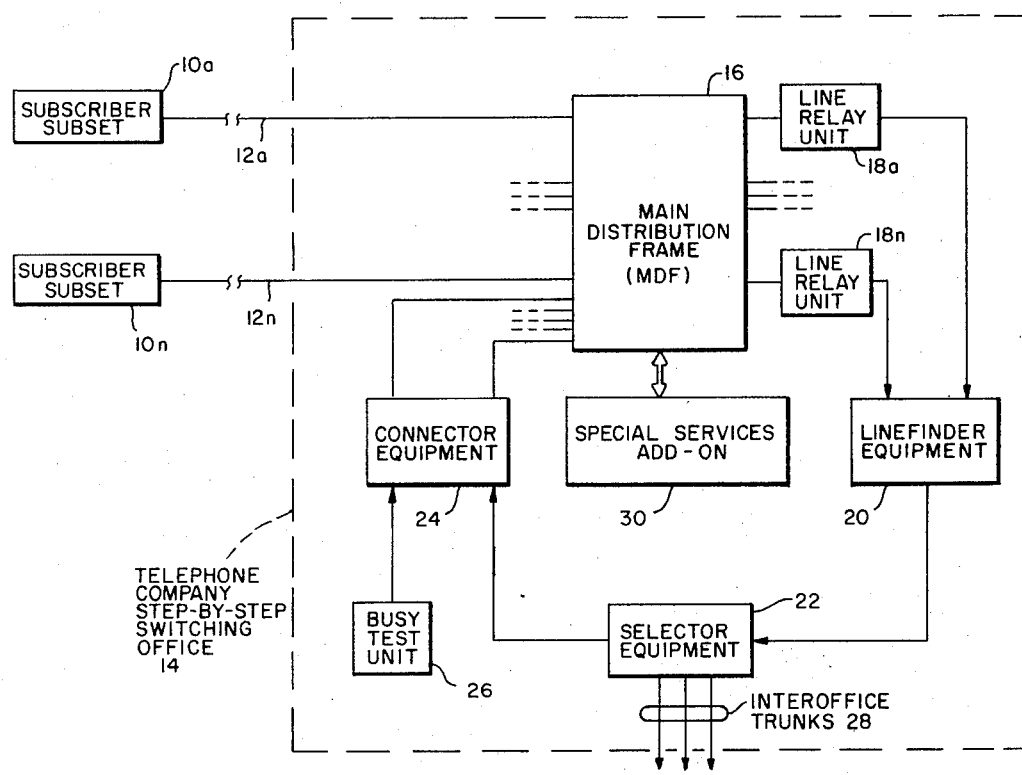

I claim:

1. A device for use in establishing conference calls via at least one telephone exchange switching system, said device comprising (a) an inlet arrnaged to be accessed by a calling party via said telephone exchange switching system, (b) a plurality of outlets arranged to provide access to respective lines of said telephone exchange system for the setting of outgoing telephone calls, (c) a conference bridge for providing a two way speech path between any two or more ports thereof, (d) first switching means for selectively connecting said inlet of said conference device either to one of said ports of said conference bridge or to any one of said plurality of outlets, (e) second switching means for connecting any one or more of said outlets of the device to ports of said conference bridge, and (f) control means connected to said inlet and responsive to predetermined incoming command signals received at said inlet for actuation of said first and second switching means upon a calling party having gained access to said inlet by actuating said first switching means to obtain a direct connection to selected outlets in order, by transmission of dialling or other call setting signals as required by said exchange, to establish outgoing telephone calls to called parties and subsequently by actuating said second switching means to connect the called parties to said conference bridge and by actuating said first switching means to connect the calling party to said conference bridge.

2. A device as claimed in claim 1, further comprising a common means for generating call setting signals for transmission from a selected outlet in response to the receipt of call setting signals at said inlet, wherein said first switching means is arranged to connect said common means for generating call setting signals selectively between said inlet and each selected outlet.

3. A device as claimed in claim 1, wherein said control means includes first means responsive to receipt at said inlet of a first predetermined command signal for actuation of said first switching means to connect said inlet to a selected outlet; second means responsive to receipt at said inlet of a call setting signal for setting a memory toggle device; and third means responsive to a second predetermined command signal for resetting said memory toggle device, the arrangement being such that when said memory toggle device is in a set condition, actuation of said first responsive means is also effective to restore said memory toggle device to a reset condition and to actuate said second switching means to connect to a corresponding port of the conference bridge a selected outlet marked by the preceding setting of the first switching means.

4. A device as claimed in claim 3, wherein said first and second switching means respectively include switch contacts connected in series between each of said outlets and the corresponding port of said conference bridge, whereby upon simultaneous actuation of the first and second switching means at a selected outlet, the latter is connected to said inlet and is isolated from the corresponding port of the conference bridge.

5. A device as claimed in claim 4, wherein the said third responsive means includes means effective when actuated whilst said first and second switching means are simultaneously actuated at a selected outlet, to restore the second switching means at said selected outlet to an idle condition.

6. A device as claimed in claim 3, in which said control means includes fourth means responsive to receipt at said inlet of a predetermined command signal other than said predetermined first signal, when said first switching means connects said inlet to said one port of said conference bridge, for rendering said first and third responsive means responsive only to predetermined third and fourth command signals respectively.

7. A device as claimed in claim 6, further comprising a common means for generating call setting signals for transmission from a said selected outlet in response to the receipt of call setting signals at said inlet, wherein said first switching means is arranged to connect said common means for generating call setting signals selectively between said inlet and each said selected outlet.

8. A device as claimed in claim 7, wherein said common means for generating call setting signals comprises a dial pulse generator for converting incoming voice-frequency (V.F.) tones received at said inlet into dial pulses for onward transmission as said call setting signals, and said fourth responsive means is further arranged to inhibit operation of the said dial pulse generator so that received V.F. tones are transmitted onward as such.

9. A device as claimed in claim 1, wherein said outlets are connected in common with the outlets of at least one other similar device to a group of telephone exchange lines serving said devices, and wherein each said outlet of the device is provided with guard means for preventing access to the respective exchange line and for marking said line busy whilst it is being accessed by a said other similar device.

10. A device as claimed in claim 9, wherein each said guard means comprises a switching means connected in series between each of said first and second switching means and the respective outlet of the device, said guard switching means being arranged, in an idle condition, to prevent access to the respective outlet and being arranged to be actuated in response to actuation of said first switching means to select said respective outlet, all of the said guard switching means individual to a respective exchange line being connected in a common pool in such a manner that only one such guard switching means can be actuated at any given time.

* * * * *

United States Patent [19]

Boatwright et al.

[11] 4,232,199
[45] Nov. 4, 1980

[54] SPECIAL SERVICES ADD-ON FOR DIAL PULSE ACTIVATED TELEPHONE SWITCHING OFFICE

[75] Inventors: John T. Boatwright, Concord; David G. Prince, New Durham; William F. Haskett; Helmut Koch, both of Concord, all of N.H.

[73] Assignee: Summa Four, Inc., Concord, N.H.

[21] Appl. No.: 952,487

[22] Filed: Oct. 18, 1978

[51] Int. Cl.² .................. H04M 1/66; H04M 3/42
[52] U.S. Cl. .................... 179/18 B; 179/16 EC; 179/18 DA; 179/18 ES; 179/99 H
[58] Field of Search .......... 179/18 B, 18 BA, 18 BD, 179/18 BE, 18 BG, 16 EC, 18 D, 18 DA, 18 ES, 99 H

[56] References Cited
U.S. PATENT DOCUMENTS

| | | | |
|---|---|---|---|
| 3,363,063 | 1/1968 | Kandel et al. | 179/18 BD |
| 3,546,393 | 12/1970 | Joel, Jr. | 179/18 B |
| 3,689,703 | 9/1972 | Allen et al. | 179/18 B |
| 3,710,033 | 1/1973 | Whitney | 179/18 BE |
| 3,959,600 | 5/1976 | Sousa | 179/18 BE |
| 3,997,731 | 12/1976 | Wilmot et al. | 179/18 B |

Primary Examiner—Thomas W. Brown
Attorney, Agent, or Firm—Cesari & McKenna

[57] ABSTRACT

A special services add-on specifically adapted for use in a dial pulse activated telephone switching office such as a step-by-step office to enable the addition of various modern features thereto, thereby extending the economic life of the office. The add-on is a stored program, processor based system that can be put into service on a line-by-line basis independent of subscriber line assignments. Among the special services provided by the add-on are incoming call alert, call conferencing, call forwarding, tone dialing, abbreviated dialing, instant recall, restricted calling, ringback, delayed ringback and ring disable. Various of the services are remotely controllable by the subscriber by dialing programming instructions to the add-on either from his own or another telephone subset.

41 Claims, 7 Drawing Figures